No. 607,776. Patented July 19, 1898.
M. A. SWAIM.
STEAM COOKER.
(Application filed Nov. 16, 1897.)
(No Model.)

Witnesses

Inventor
Mary A. Swaim
by Alexander & Dowell
her Attorneys

UNITED STATES PATENT OFFICE.

MARY ALICE SWAIM, OF ST. JOSEPH, ILLINOIS.

STEAM-COOKER.

SPECIFICATION forming part of Letters Patent No. 607,776, dated July 19, 1898.

Application filed November 16, 1897. Serial No. 658,767. (No model.)

*To all whom it may concern:*

Be it known that I, MARY ALICE SWAIM, of St. Joseph, in the county of Champaign and State of Illinois, have invented certain new and useful Improvements in Steam-Cookers; and I hereby declare that the following is a full, clear, and exact description thereof, reference being had to the accompanying drawings, which form part of this specification.

This invention is an improved steam cooking or heating oven especially designed for use on small lamp or gas or gasolene stoves. Its object is to utilize the steam to the very best advantage in cooking and to so construct the oven that the food may be cooked either by direct subjection to the steam or steam can be excluded from the food and the latter cooked merely by the steam heat.

The invention consists in the construction and combination of parts hereinafter described and claimed, and more particularly illustrated in the accompanying drawings, in which—

Figure 1:
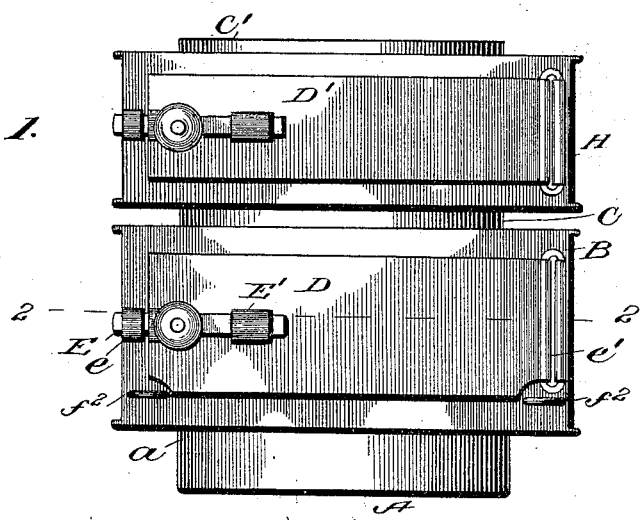
Figure 2:
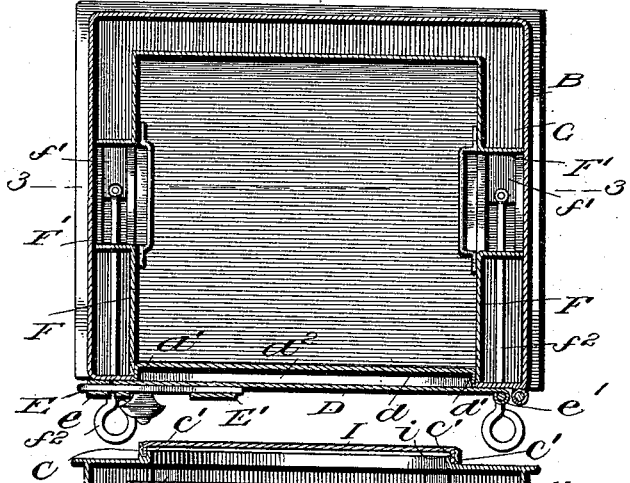
Figure 3:
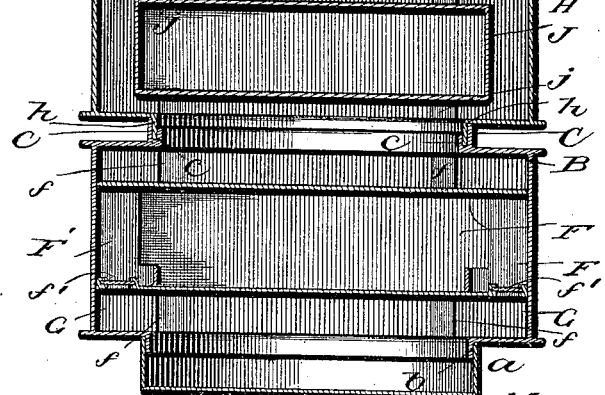

Figure 1 is a side view of the cooker complete. Fig. 2 is a horizontal section therethrough on line 2 2, Fig. 1; and Fig. 3, a vertical section on line 3 3, Fig. 2.

Referring to said drawings, A designates a water-pan which has a preferably circular upstanding flange $a$ and is adapted to be placed over the burner of a stove upon which the oven is to be used. The lower oven, which is supported upon this water-pan, consists of an outer and inner casing. The outer casing B is shown rectangular in plan and is preferably made of sheet metal. In the bottom of said casing is a large opening of about the same diameter as the water-pan and having a depending flange $b$, adapted to fit into the flange $a$ of the water-pan, so as to form a substantially steam-tight joint therewith, and in the top of casing B is another large opening, which is surrounded by circular parallel flanges C and $c$, the inner flange $c$ being of less height than the outer flange C.

In the front side of the casing is a door D, provided on its inner side with an inner wall $d$, formed of a sheet-metal plate having its edges bent over into flanges $d'$, which are made fast to the inner face of the door in any suitable manner, so that a dead-air space $d^2$ is formed between the inner and outer walls of the door. This door is hinged at $e'$ at one end and may be provided with any suitable fastening, and, as shown, is provided with a sliding catch E, guided in loops E', attached to the door and adapted to engage a loop $e$ on the side of the casing, as shown.

Within casing B is an inner casing F, which is supported within casing B by means of metal brackets or pieces $f$ in such manner that a steam-space G is left between the walls of the casings B and F, except at the side next door D, where the sides, top, and bottom of casing F are closely connected to the front wall of casing B, as shown, so that access can be had to the interior of the oven through door D.

It will be observed that the openings in the outer casing are of less area than the inner casing, and the latter is so arranged that the vapors rising through the lower openings strike the under side thereof and are deflected outwardly and around the sides of the inner casing and then pass inwardly over the top of the inner casing, so as to pass to the proper opening in the outer casing, and when two or more ovens are used the vapors similarly envelop the inner casing in the superimposed ovens.

In the opposite sides of casing F are offsets F', in the bottoms of which are inlet-openings closed by slide-valves $f'$, which can be operated by rods $f^2$, that extend through the front wall of the outer casing B, as shown. When these valves are open, steam can enter directly into casing F from chamber G; but when these valves are closed it is excluded therefrom and can only circulate around the exterior thereof within chamber G.

The opening in the top of casing B may be closed by any suitable means if only a single oven is to be used; but in practice, if more than one oven is to be used, a second oven is superimposed on the lower oven and is constructed almost identically like the latter, having an outer casing H, with an opening in its bottom, surrounded by an annular flange $h$, adapted to fit between the flanges C and $c$ on the top of the lower oven, and also having an opening in its top, surrounded by annular flanges C' $c'$, over which another oven may be fitted, or, as shown, this opening may be closed by a cap I, having an annular flange $i$, adapted to fit between the flanges C $c$, as shown. The upper oven has an inner casing J, which is supported therein on brackets $j$, substantially like casing F is supported in casing B, and access can be had to the upper oven through an opening in the front wall of casing H, closed by a door D′, constructed substantially like door D, as shown.

In practice a number of like ovens may be superimposed one above the other, the opening in the topmost oven being closed by a plate I, and more or less of such ovens can be used, as desired, by simply adding or removing them, as is obvious, the opening in the uppermost oven being always closed by the plate I.

It will be observed by reference to the drawings that steam generated in pan A will flow into casing B and around the casing F therein, then up in like manner into and through the superimposed oven, and so on through any successive number of ovens. If desired, by opening valves $f'$ steam could be admitted directly into the lower casing F.

While the upper oven is not shown as provided with the offsets F′ and valves $f''$, they might be so provided, if desired.

While this construction is very simple, it enables all parts of the apparatus to be readily cleansed, and the number of ovens in use can be readily increased or diminished as needed.

Each oven is light, and the simplicity and effectiveness of the apparatus will be apparent from the drawings.

Having thus described my invention, what I therefore claim as new, and desire to secure by Letters Patent thereon, is—

1. In a steam cooking-oven, the combination of a generator, and an oven detachably mounted thereon, consisting of an outer casing and an inner casing smaller than, and spaced from, the outer casing, and secured within the latter, said outer casing being provided with an opening in its bottom, of less area than the inner casing and fitted over the generator, by which the vapors rising from said opening strike the under side of the inner casing and are deflected around the sides thereof, and said inner casing being provided with a valved opening, by which the vapors may be permitted to enter said inner casing, and a door at one side of the oven through which access can be had to the inner casing, for the purpose and substantially as described.

2. In a steam cooking-oven, the combination of a water-pan or generator and an oven detachably mounted thereon, said oven being of larger diameter than said generator and consisting of an outer casing having openings in its top and bottom surrounded by flanges, and an inner casing within the outer casing, and spaced from the walls of the outer casing, said inner casing being interposed between and of larger diameter than the openings in the top and bottom of the outer casing, so that the vapors rising through said opening will strike the bottom of said inner casing, and be deflected outwardly, to, and around the sides thereof, and then inwardly over the top thereof, said oven being provided with a door whereby access may be had to the inner casing, substantially as described.

3. In a steam-cooker, the combination of a water-pan or generator, with superimposed steam-ovens detachably mounted upon said generator, each oven comprising an outer casing and an inner casing spaced from the outer casing, said outer casing being provided with openings in its top and bottom of a diameter less than that of the inner casing, whereby the vapors rising from the generator are caused to strike the under sides of the inner casing and be deflected outwardly around the sides thereof and then inwardly again to pass to the upper opening in the outer casing, and each of said openings being surrounded by a flange, the flanges of the lower openings being adapted to engage the flanges of the upper opening of the underlying oven or generator so as to keep the ovens in proper relative position, and a cover closing the top opening in the uppermost oven, for the purpose and substantially as described.

In testimony that I claim the foregoing as my own I affix my signature in presence of two witnesses.

MARY ALICE SWAIM.

In presence of—
WILBURN J. SWAIM,
EDWARD HUDSON.